US006533098B1

(12) United States Patent
Winkler

(10) Patent No.: US 6,533,098 B1
(45) Date of Patent: Mar. 18, 2003

(54) ESCALATOR OR MOVING WALKWAY WITH PARTITION WALLS

(75) Inventor: Gerald Winkler, Neusiedl (AT)

(73) Assignee: Inventio AG, Hergiswil NW (CH)

(*) Notice: Subject to any disclaimer, the term of this patent is extended or adjusted under 35 U.S.C. 154(b) by 0 days.

(21) Appl. No.: 09/808,482

(22) Filed: Mar. 14, 2001

(30) Foreign Application Priority Data

Mar. 31, 2000 (EP) ........................................ 00810279

(51) Int. Cl.$^{7}$ ........................................ B65G 15/00

(52) U.S. Cl. ........................ 198/321; 198/326; 198/335; 198/337

(58) Field of Search ........................ 198/321, 326, 198/335, 337; 52/481.1, 481.2, 730.4

(56) References Cited

U.S. PATENT DOCUMENTS 1,603,895 A * 10/1926 Berger ........................ 411/399
2,576,556 A * 11/1951 Babson ........................ 198/335
3,144,118 A 8/1964 Fabula
4,811,829 A * 3/1989 Nakazawa et al. .......... 198/326
5,542,522 A * 8/1996 Adrian et al. ............... 198/337
6,006,889 A * 12/1999 Caron ........................ 198/335
6,223,879 B1 * 5/2001 Schops ........................ 198/321
6,336,298 B1 * 1/2002 Chou ........................ 52/238.1

FOREIGN PATENT DOCUMENTS

EP 0 866 019 A1 9/1998

OTHER PUBLICATIONS

Patent Abstracts of Japan, Pub No. 08002866, Jan. 9, 1996. "Passenger Conveyor".

* cited by examiner

*Primary Examiner*—Christopher P. Ellis
*Assistant Examiner*—Richard Ridley
(74) *Attorney, Agent, or Firm*—Schweitzer Cornman Gross & Bondell LLP

(57) ABSTRACT

An escalator construction has a framework, steps and a balustrade at both sides of the steps. The balustrade is fastened to balustrade posts. Clamps for profile tubes are provided at the framework and optionally also at the balustrade posts, U-profile members for receiving the profile tubes can be provided at the lower part of the framework Partition walls are fastened to both the inner and outer sides of the profile tubes. In order to cover the fasteners, the outer partition walls are fastened at least at its lower portion from an internal face, while the fasteners at the lower portion of the inner walls are covered by the balustrade. The fasteners for the upper portions of the partition walls may be covered by a cover profile member.

10 Claims, 7 Drawing Sheets

ESCALATOR OR MOVING WALKWAY WITH PARTITION WALLS

The invention relates to an escalator or a moving walkway construction having a framework, with steps and with a balustrade at both sides of the steps, wherein the balustrade is fastened to balustrade posts.

BACKGROUND OF THE INVENTION

Escalators and moving walkways have achieved a wide-ranging utilization in the area of transport of public traffic as in underground stations, railway stations and so forth. A fixed stairway is often present parallel to the escalator or moving walkway (see, for example, U.S. Pat. No. 3,144,118). Accidents can happen with combined installations of that type as a result of unauthorized climbing over of the escalator or walkway balustrade and jumping onto or jumping off the escalator or moving walkway.

Such accidents can be avoided by partition walls between the escalator/walkway and staircase. However, the mounting of partition walls at the escalator or moving walkway or at the fixed stairway, particularly as a retrofit to an existing construction, is difficult and entails a great deal of work and expense.

It is accordingly an object of the present invention to provide an escalator or a moving walkway which can be provided with a partition wall in a simple and efficient manner.

BRIEF DESCRIPTION OF THE INVENTION

According to the invention the foregoing and other objects are met by an escalator or a moving walkway having clamps for profile tubes provided at the escalator framework and optionally also at the escalator's balustrade posts.

According to the invention the escalator framework is thus provided at the outset with clamps to which profile tubes can be fixed. Partition walls can then be fastened to the profile tubes. Neither drilling nor welding is needed at the installation location for mounting the partition walls. This is accordingly of great advantage, as drilling or welding of the framework typically requires subsequent static testing of the construction. Moreover, the assembly time at the installation location is reduced. A further benefit is that the partition walls can later be easily demounted for exchange or repair.

Preferably, U profile members for reception of the profile tubes are provided at the lower part of the framework. The U-profile members support the profile tubes and prevent the profile tubes from slipping down in the clamps in the event that clamps become loose. A further advantage of such a construction is that the profile tubes can be mounted by a workman standing on the step belt; the profile tube can be inserted from above through the open clamps and into the U-profile member. The clamps, which may be disposed above the U-profile members, are accessible from the step belt.

The clamps and U-profile members serve to fasten the profile tubes to which the partition walls are fastened. The partition walls can be fastened not only on the outer side, but also on the inner side of the profile tubes. In this manner the profile tubes are covered to lessen the risk of contact injury.

Preferably, the partition walls at the outer side are fastened at least at their underside from within, so that at least the lower fastening elements are covered. This not only improves the appearance of the construction, but also prevents unauthorized removal of the fastening elements. In order to achieve the same effect for the inner partition walls, the lower fastening elements of the partition walls at the inner side can be covered by the balustrade. If it is desired that the upper fastening elements should also be invisible, the upper fastening elements of the partition walls can be covered by a cover profile member.

The present invention also embraces a prefabricated partition wall for escalators and moving walkways, wherein outer partition walls and inner partition walls are pre-fastened to profile tubes disposed therebetween. By use of such prefabricated partition walls the assembly time at the place of erection can be further significantly reduced. No modifying operations are necessary at the place of erection; the profile tubes and attached partition walls only have to be mounted to the clamps.

BRIEF DESCRIPTION OF THE DRAWINGS

The present invention is more fully explained in the following detailed description taken with reference to the accompanying figures, wherein.

DETAILED DESCRIPTION OF THE INVENTION

Figure 1:
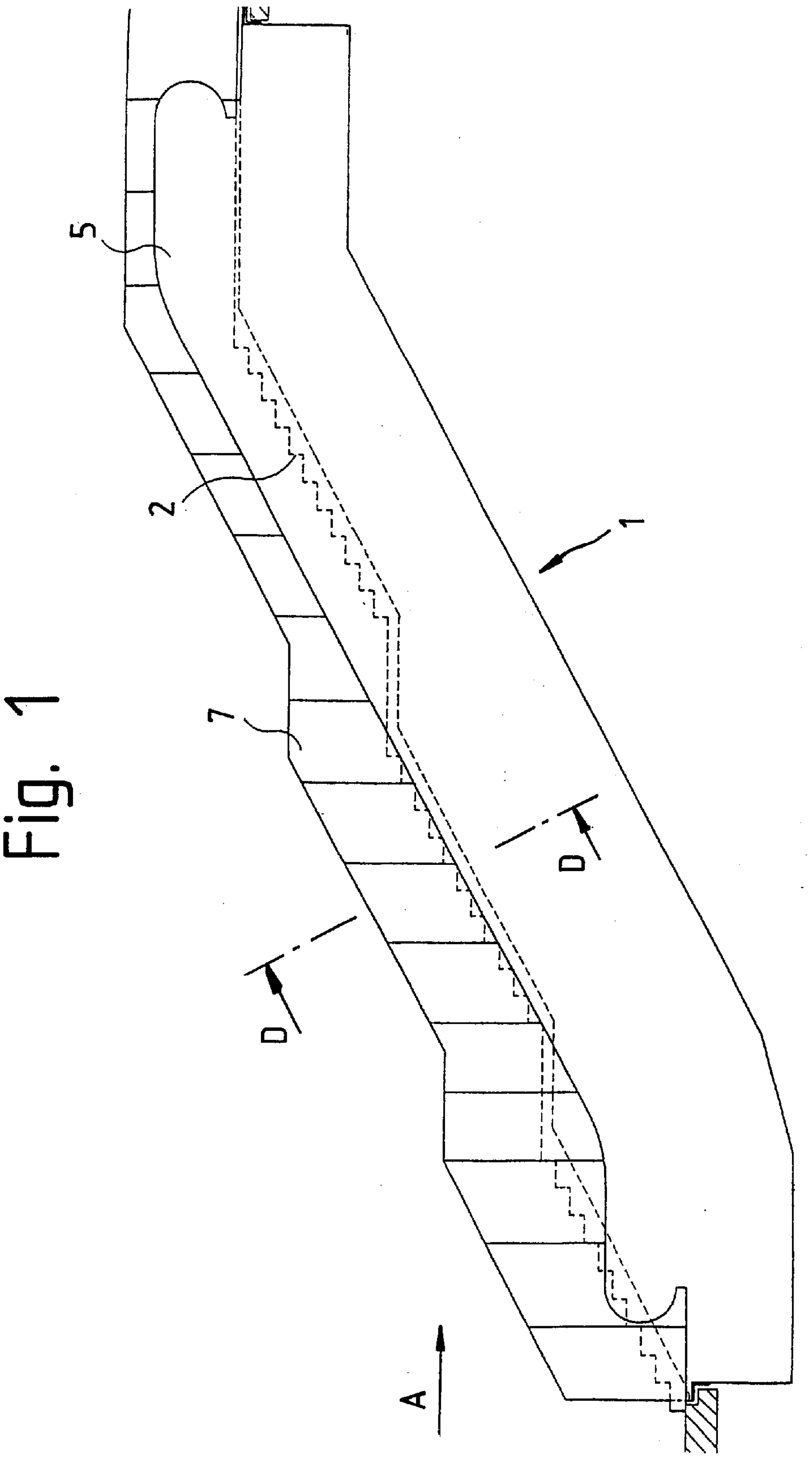
FIG. 1 shows an escalator in side elevation view with a fixed stairway disposed therebehind.
Figure 2:
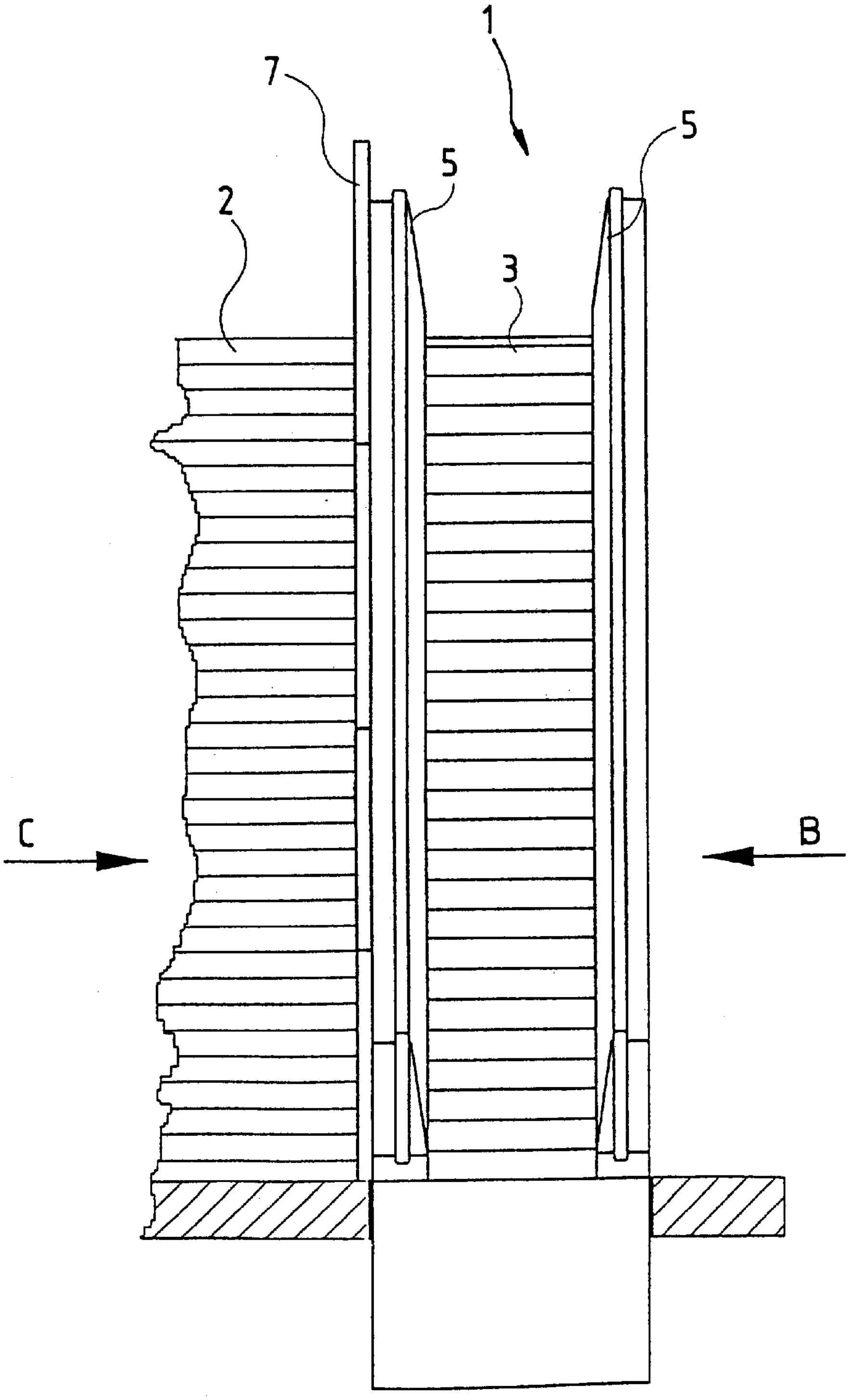
FIG. 2 shows an elevation view in the direction A in FIG. 1.

As seen in FIGS. 1 and 2, escalator 1 has, as known, a balustrade 5 at both sides of the steps 3. In FIG. 1 a fixed stairway 2 is disposed behind the escalator. (In the view according to FIG. 2, the stairway 2 lies at the left of the escalator.) In order to prevent jumping over the balustrade 5, a partition wall 7 is provided between the escalator 1 and the fixed stairway 2.

Figure 3:
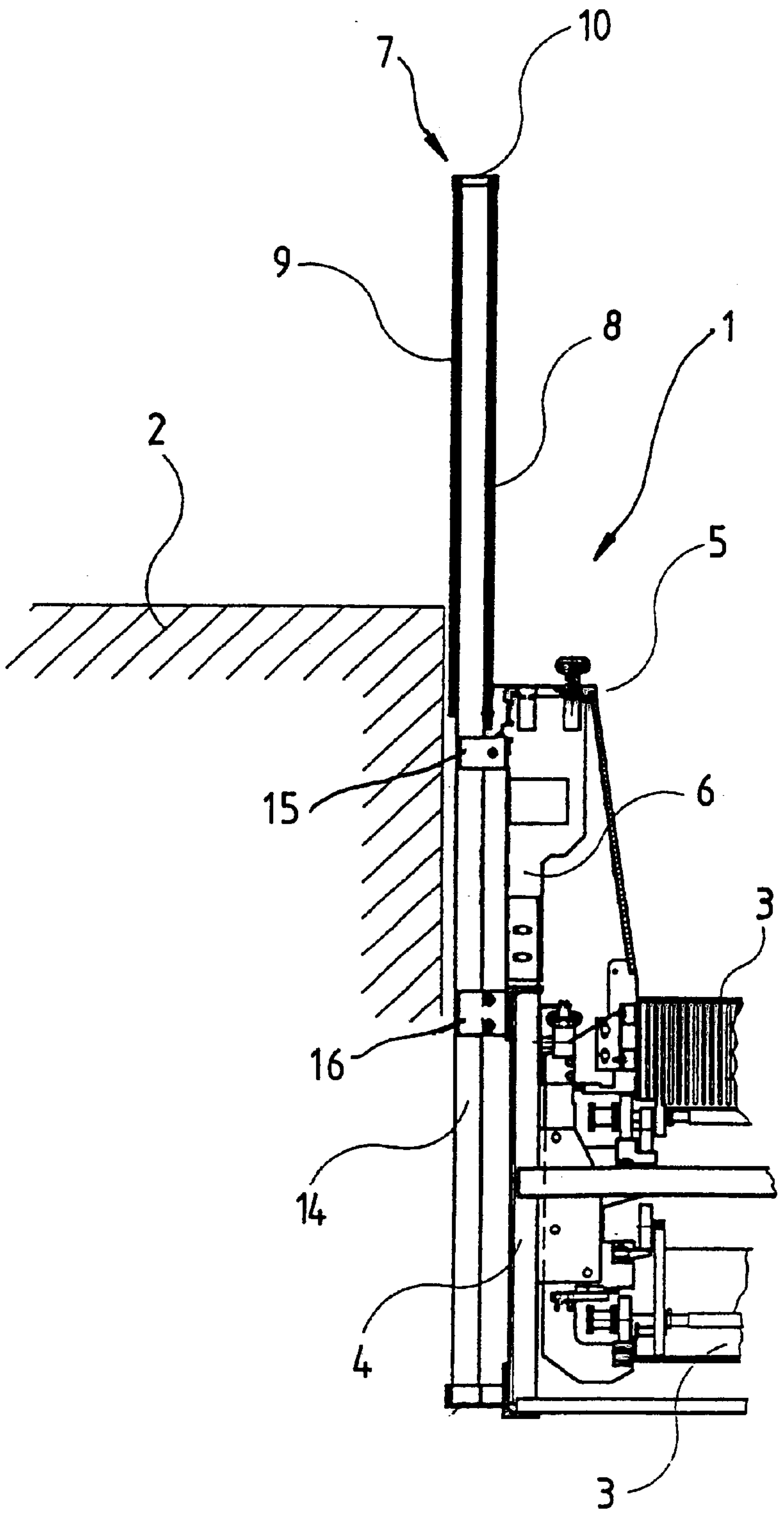
FIG. 3 shows a section along the line D—D in FIG. 1.
Figure 4:
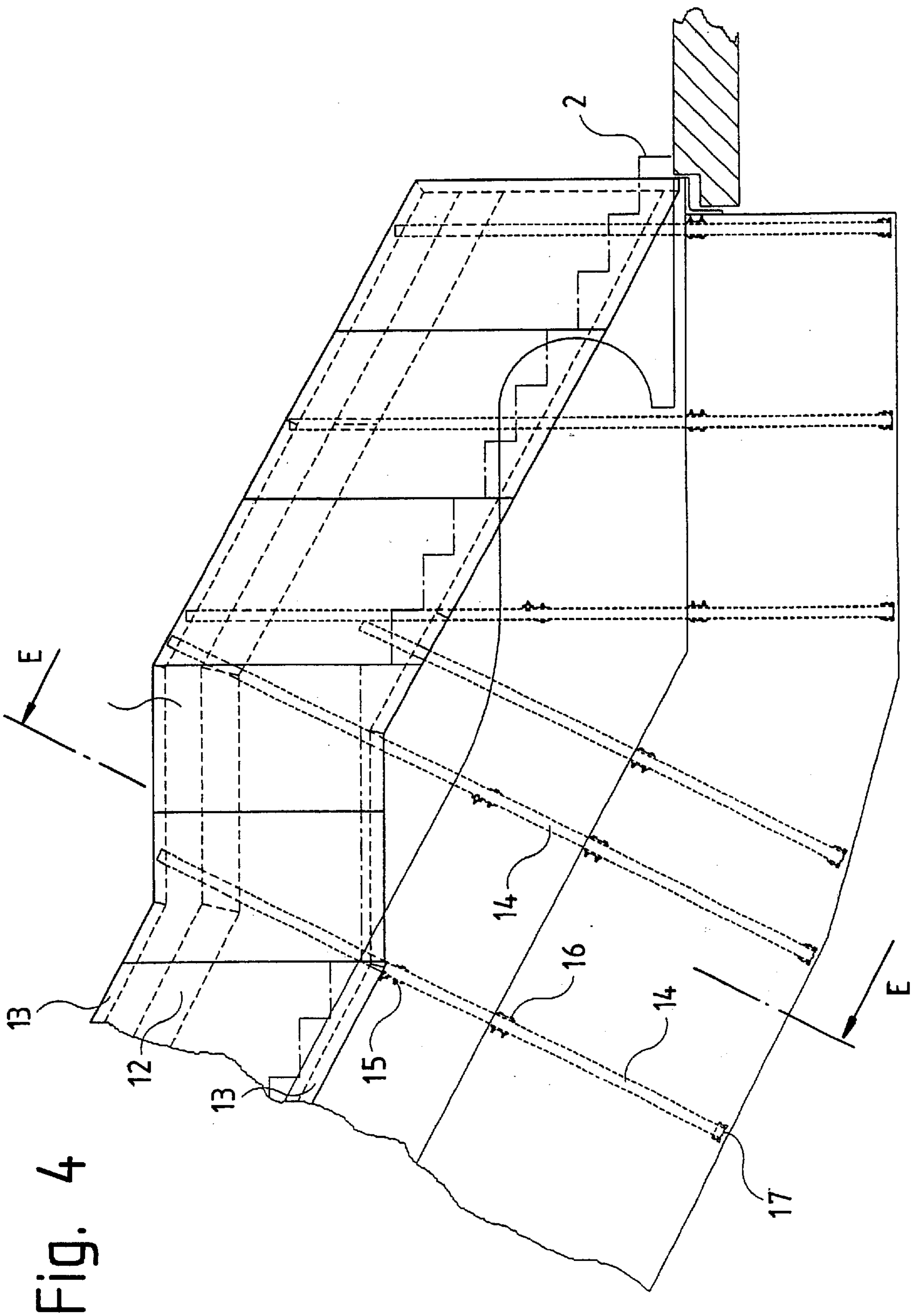
FIG. 4 shows an elevation view in the direction of arrow C in FIG. 2 of the lower part of the fixed stairway and the escalator.
Figure 5:
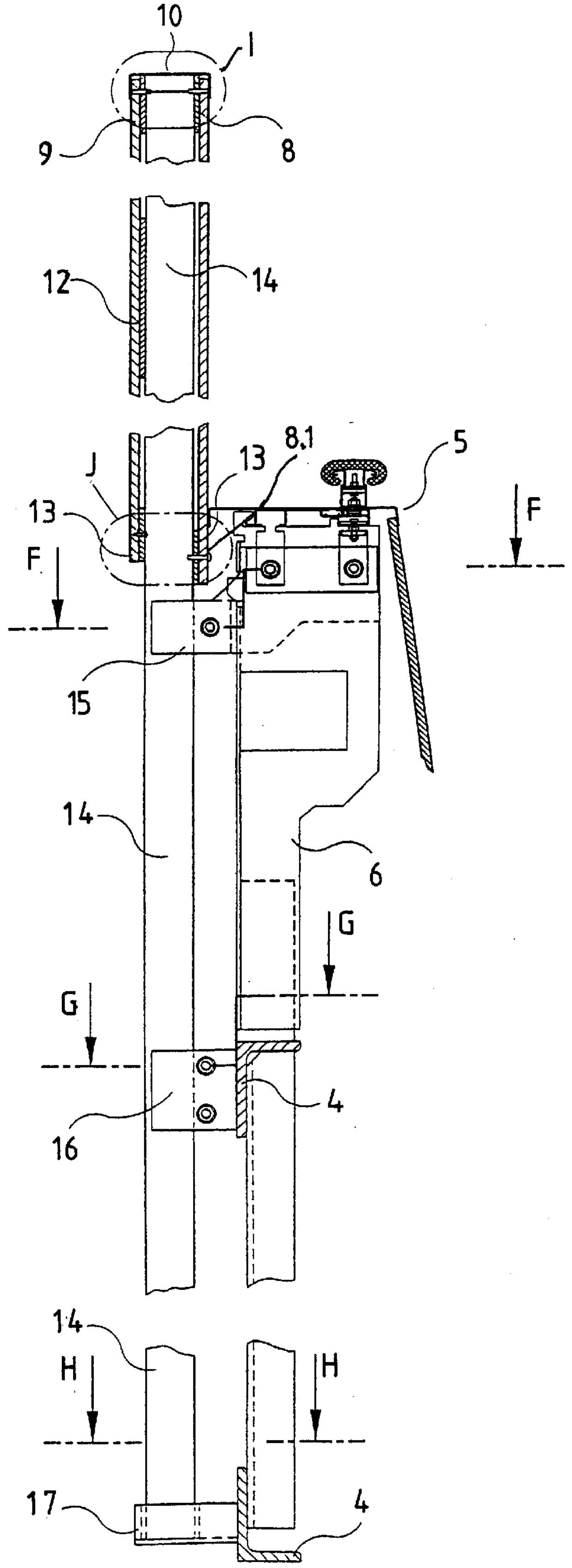
FIG. 5 shows a section along the line E—E in FIG. 4.

More details of the partition walls 7 are depicted in FIG. 3. As shown therein, escalator framework 4 has a U-profile member 17 mounted at its bottom and a clamp 16 mounted at its top. Balustrade post 6 has a clamp 15 mounted thereto. The two clamps 15 and 16, along with the U-profile member 17, support a profile tube 14. As can be seen by consideration of FIG. 4, a plurality of profile tubes 14 may be arranged in this manner, and distributed over the length of the escalator 1. Fastened to the profile tubes 14 are an outer partition wall 9 (see, again, FIG. 3) and an inner partition wall 8 comprising the partition wall 7. The partition walls 8 and 9 are closed at the top by a cover profile member 10.

The fastening of the partition walls 8 and 9 is seen in FIGS. 4, 5, 9 and 10. Upper and lower flat bars 13 (see, in particular, FIG. 4) are affixed to the inner and outer sides of the profile tubes, and extend at a spacing from one another between the profile tubes 14. Metal sheets or panels 12 extend between the profile tubes, and are positioned between the flat bars 13 on each side of the profile tube D. The fastening of the partition walls 8, 9 is carried out by fastening elements 8.1, 9.1 (see FIGS. 9, 10), such as bolts or screws, which fix the partition walls 8, 9 to the flat bars 13. The metal sheets 12 serve only to additionally support the walls.

Figure 10:
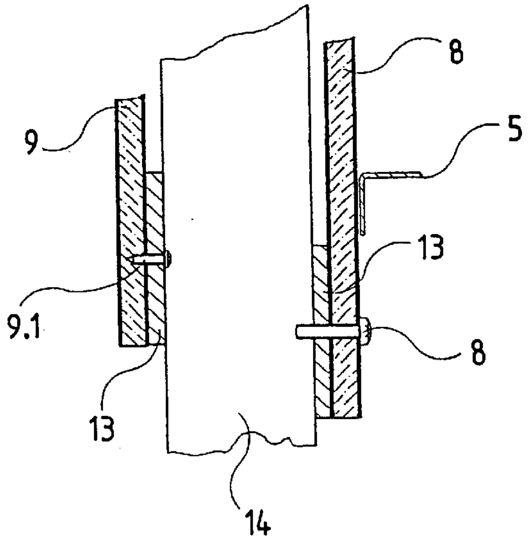
FIG. 10 shows and enlarged, detail view of region J of FIG. 5.

As can be recognized from FIG. 10, the lower screws 9.1 for the outer partition wall 9 are fitted from inside so that they are not visible from the outside, and thus are installed before the inner partition wall 8 is mounted. It can be recognized by reference to FIG. 5 that the lower screws 8.1 for the inner partition wall 8 are covered by the balustrade 5.

Figure 9:
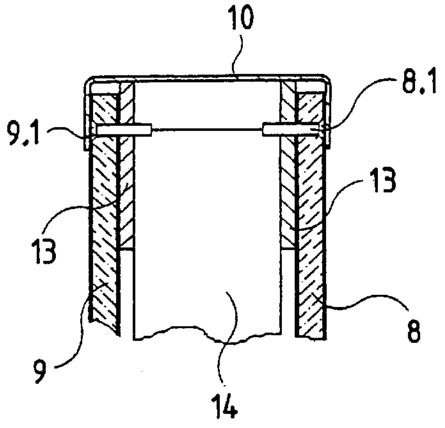
FIG. 9 shows an enlarged, detail view of region I of FIG. 5.
Figure 11:
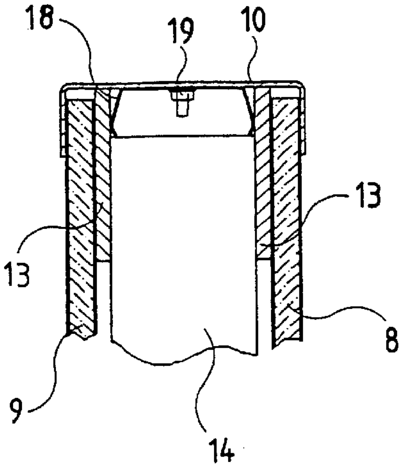
FIG. 11 shows a view analogous to FIG. 9 of an alternative embodiment.

As detailed in FIG. 9, the upper screws 8.1, 9.1 for the partition walls 8, 9 are covered by the cover profile member 10. This is not, however, absolutely necessary. The screws 8.1, 9.1 may be inserted through the cover profile member 10 so that the cover profile member 10 is fixed thereby all or some of the screws can be so employed. If it is desired to entirely avoid visible screws, the embodiment according to FIG. 11 can be used; a spring 18 is fastened by a bolt 19 to the cover profile member 10. Alternatively, it may be glued or welded. The fastening of the cover profile member 10 is effected by the clamping effect of the spring 18 against the flat bars 13 and between the partition walls 8, 9.

Figure 6:
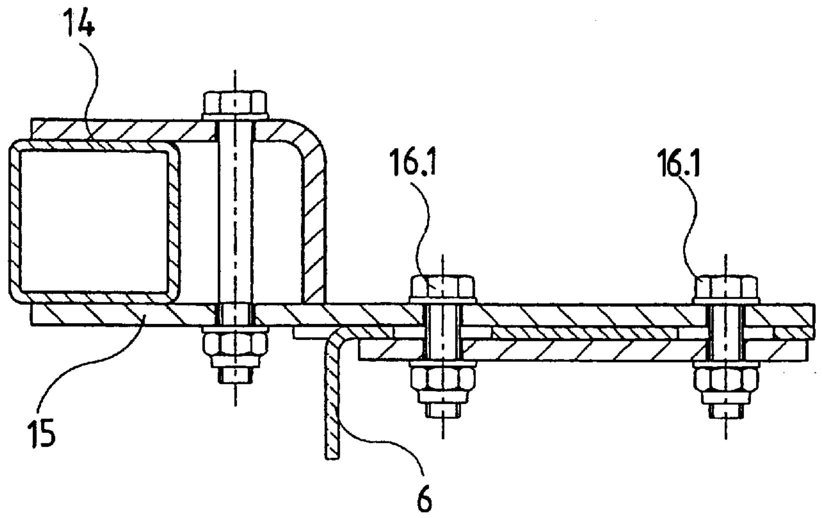
FIG. 6 shows a section though a clamp at a balustrade post along the line F—F in FIG. 5.
Figure 7:
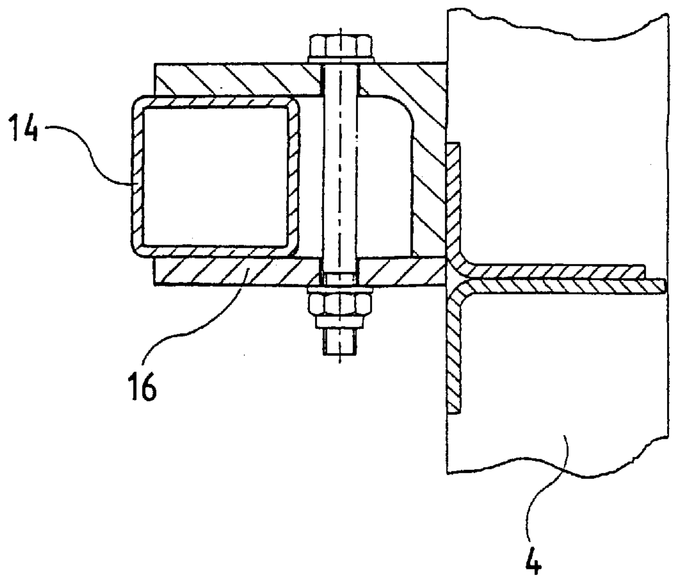
FIG. 7 shows a section through a clamp at the framework along the line G—G in FIG. 5.
Figure 8:
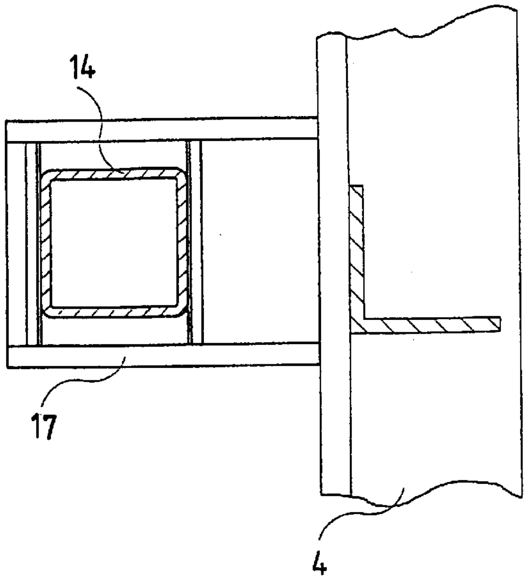
FIG. 8 shows a section along the line H—H in FIG. 5 just above a U-profile member.

The fastening of the profile tubes is detailed in FIGS. 6 to 8. An uppermost fastening is effected by clamps 15 (see FIG. 6), which are fastened to the balustrade posts 6 by screws 16.1. A lower fastening is accomplished by clamps 16 (see FIG. 7), which are fastened to the framework 4. The bottoms of the profile tubes 14 rest in U-profile members 17 (see FIG. 8), which are fastened to a lower angle member of the framework 4. The clamps 15 and 16 may be of conventional construction with a pair of opposed jaws between which the profile tube is placed, the jaws being tightened by a bolt assembly. The U-profile member 17 in which the bottom of the profile tube rests may be provided with cross-members between which the profile tube sits to further position the profile tube within the U-profile member.

I claim:

1. An escalator or moving walkway with a framework, with steps and with a balustrade at both sides of the steps, wherein the balustrade is fastened to balustrade posts, characterized in that clamps for profile tubes of a partition wall mountable upon the escalator or moving walkway are provided at the framework.

2. The escalator or walkway according to claim 1 further characterized in that clamps for the profile member are also provided at the balustrade posts.

3. An escalator or moving walkway according to claim 1 or claim 2, further characterized in that U profile members for reception of the profile tubes are provided at a lower part of the framework.

4. An escalator or moving walkway according to claim 3, further characterized in that the profile tubes are fastened to the clamps and rest in the U-profile members and that partition walls are fastened to the profile tubes.

5. An escalator or moving walkway according to claim 4, further characterized in that the partition walls comprise inner and outer walls fastened respectively to the inner sides and outer sides of the profile tubes.

6. An escalator or moving walkway according to claim 4, further characterized in that the outer walls are fastened at least at a lower portion with fastening elements from an interior side, whereby the fastening elements are not exposed.

7. An escalator or moving walkway according to claim 5, further characterized in that the inner wall is fastened at least at a lower portion with fastening elements, the fastening elements being covered by the balustrade.

8. An escalator or moving walkway according to claim 4, characterized in that at least one of the inner and outer walls is fastened at an upper portion by a fastening element covered by a cover profile member.

9. The escalator or moving walkway according to claim 1 further comprising a prefabricated partition wall having an outer wall and an inner wall fastened to profile tubes disposed therebetween.

10. A prefabricated escalator partition wall for an escalator or moving walkway, the escalator or walkway including a framework, steps and a balustrade besides the steps, wherein the balustrade is fastened to balustrade posts and clamps are provided at framework or at the balustrade posts, the partition wall comprising an outer wall and an inner wall fastened to profile tubes disposed therebetween, wherein the profile tubes include means for fastening the profile tubes to the escalator or walkway by means of the clamps.

* * * * *